United States Patent
Peebles et al.

(10) Patent No.: US 10,479,609 B2
(45) Date of Patent: Nov. 19, 2019

(54) CONVEYOR SYSTEM WITH SELECTIVE CARRIAGE VACUUM SUPPLY

(71) Applicant: KHS USA, Inc., Sarasota, FL (US)

(72) Inventors: Donald Scott Peebles, Bradenton, FL (US); Roger Calabrese, Bradenton, FL (US); Oliver Watmough, Sarasota, FL (US)

(73) Assignee: KHS USA, INC., Sarasota, FL (US)

( * ) Notice: Subject to any disclaimer, the term of this patent is extended or adjusted under 35 U.S.C. 154(b) by 0 days.

(21) Appl. No.: 16/000,120

(22) Filed: Jun. 5, 2018

(65) Prior Publication Data

US 2018/0354723 A1 Dec. 13, 2018

Related U.S. Application Data

(60) Provisional application No. 62/517,106, filed on Jun. 8, 2017.

(51) Int. Cl.
*B65G 21/20* (2006.01)
*B65G 54/02* (2006.01)

(52) U.S. Cl.
CPC ......... *B65G 21/2036* (2013.01); *B65G 54/02* (2013.01)

(58) Field of Classification Search
CPC ............ B65G 21/2027; B65G 21/2036; B65G 35/06; B65G 47/914; B65G 54/02
See application file for complete search history.

(56) References Cited

U.S. PATENT DOCUMENTS

| 6,155,555 | A | * | 12/2000 | Maass | B65H 1/04 271/107 |
|---|---|---|---|---|---|
| 9,422,121 | B2 | * | 8/2016 | Staunton | H01L 21/67709 |
| 9,511,681 | B2 | * | 12/2016 | Wernersbach | B60L 13/006 |
| 2015/0230369 | A1 | * | 8/2015 | Danek | H05K 13/0408 29/832 |
| 2017/0050332 | A1 | * | 2/2017 | Bauer | B26D 7/32 |
| 2019/0047799 | A1 | * | 2/2019 | Spotti | B65G 35/06 |

FOREIGN PATENT DOCUMENTS

| DE | 102007059611 A1 | * | 6/2009 | ............. B65G 35/06 |
|---|---|---|---|---|
| EP | 2116489 A1 | * | 11/2009 | ............. B65G 15/58 |
| EP | 2551219 A1 | * | 1/2013 | ......... B65G 21/2036 |

* cited by examiner

*Primary Examiner* — Gene O Crawford
*Assistant Examiner* — Keith R Campbell
(74) *Attorney, Agent, or Firm* — Allen Dyer Doppelt & Gilchrist P.A.

(57) ABSTRACT

A conveyor system comprises a track extending along a conveying path, and one or more carriages having a mounting section slidably engaging the track, with a vacuum connection being formed in the mounting section. A driving mechanism moves the carriages along the conveying path. A plurality of vacuum valves connected to the track along the conveying path, and a vacuum source is connected to the plurality of vacuum valves to supply vacuum thereto. The conveyor system is configured to selectively supply vacuum to the vacuum connection of the least one carriage via the plurality of vacuum valves based on a proximity of the at least one carriage thereto.

19 Claims, 5 Drawing Sheets

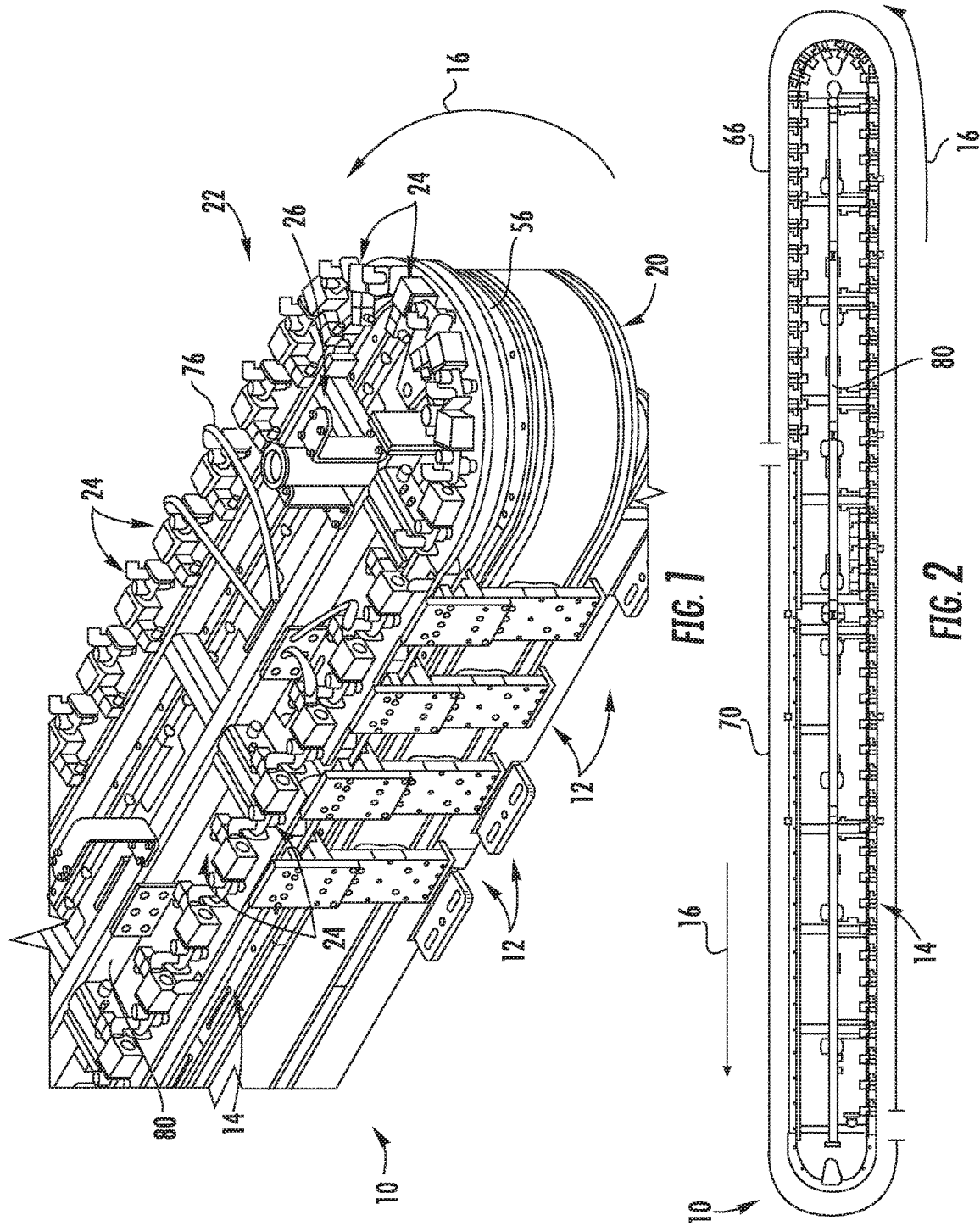

CONVEYOR SYSTEM WITH SELECTIVE CARRIAGE VACUUM SUPPLY

CROSS-REFERENCE TO RELATED APPLICATION

This application claims the benefit of U.S. Provisional Patent Application Ser. No. 62/517,106, filed on Jun. 8, 2017, the contents of which are herein incorporated by reference in their entirety.

FIELD OF THE INVENTION

The present invention relates to industrial conveyor systems, and more particularly, to packaging industry conveyor systems using vacuum.

BACKGROUND OF THE INVENTION

Vacuum is used for various reasons in many automated industrial processes—including within the packaging industry. If vacuum is supplied to a moving part and/or via a moving tool, then some special provision must be made to supply vacuum thereto. In the packaging industry, many packaging machines employ multiple carriages (sometimes movable independently of each other) which travel around a conveying path in a compete circuit. Supplying vacuum via such carriages presents a particular design challenge.

SUMMARY OF THE INVENTION

In view of the foregoing, it is an object of the present invention to provide a conveyor system with selective carriage vacuum supply. According to an embodiment of the present invention, a conveyor system comprises a track extending along a conveying path, and one or more carriages having a mounting section slidably engaging the track, with a vacuum connection being formed in the mounting section. A driving mechanism moves the carriages along the conveying path. A plurality of vacuum valves are connected to the track along the conveying path, and a vacuum source is connected to the plurality of vacuum valves to supply vacuum thereto. The conveyor system is configured to selectively supply vacuum to the vacuum connection of the least one carriage via the plurality of vacuum valves based on a proximity of the at least one carriage thereto.

These and other objects, aspects and advantages of the present invention will be better appreciated in view of the drawings and following detailed description of preferred embodiments.

BRIEF DESCRIPTION OF THE DRAWINGS

FIG. 1 is perspective view of a portion of a conveyor system, according to an embodiment of the present invention;

FIG. 2 is a top view of a track of the conveyor system of FIG. 1;

DETAILED DESCRIPTION OF PREFERRED EMBODIMENTS

Figure 3:
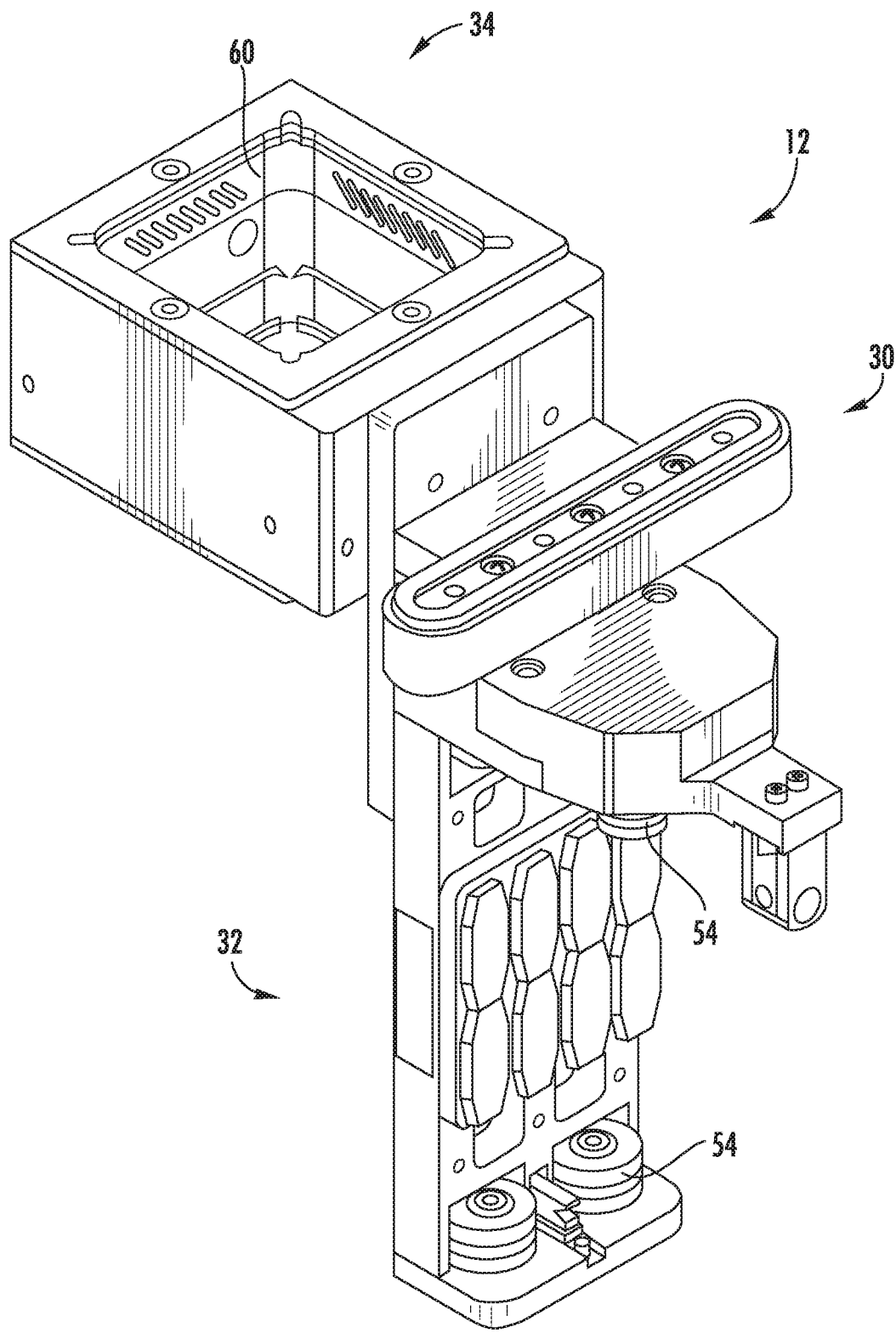
FIG. 3 is a perspective view of a carriage of the conveyor system of FIG. 1.

Referring to FIGS. 1 and 2, according to an embodiment of the present invention, a conveyor system 10 includes a plurality of carriages 12 slidably mounted to a track 14 extending along a conveying path 16. A driving mechanism 20 is operable to move the carriages 12 along the conveying path. A vacuum subsystem 22 selectively supplies vacuum to the carriages 12 during their motion around at least a portion of the track 14. The vacuum subsystem 22 includes a plurality of vacuum valves 24 connected to the track 14 and a vacuum source 26 supplying vacuum thereto. Advantageously, using the vacuum subsystem 22, the conveyor system 10 selectively supplies vacuum to the carriages 12 from the source 26 via the vacuum valves 24 based on the proximity of the carriages 12 to the valves 24.

Referring to FIG. 3, each carriage 12 includes a mounting section 30, a driving mechanism engagement section 32 and a workpiece retention section 34. The mounting section 30 slidably engages the track 14, while the driving mechanism engagement section 32 is engaged by the driving mechanism 20 to move the carriage 12. Where it is desired for the carriage 12 to move a workpiece around at least a portion of the conveyor system 10, the workpiece retention section 34 is configured to releasably secure a workpiece (e.g., packaging material) thereto.

Figure 4:
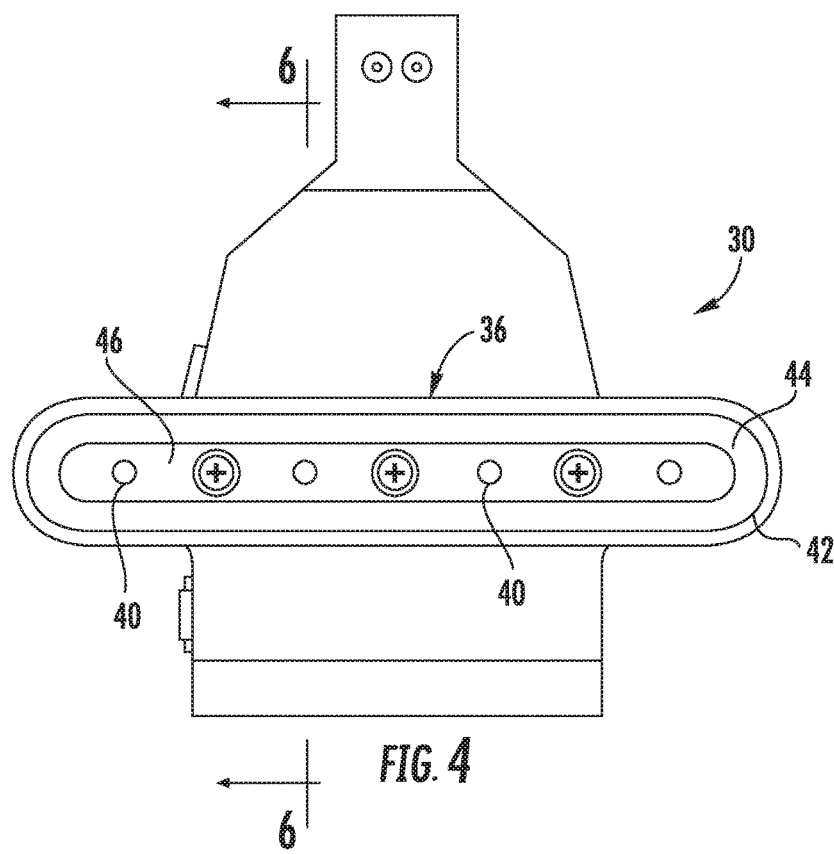
FIG. 4 is a top view of a mounting section of the carriage of FIG. 3.
Figure 5:
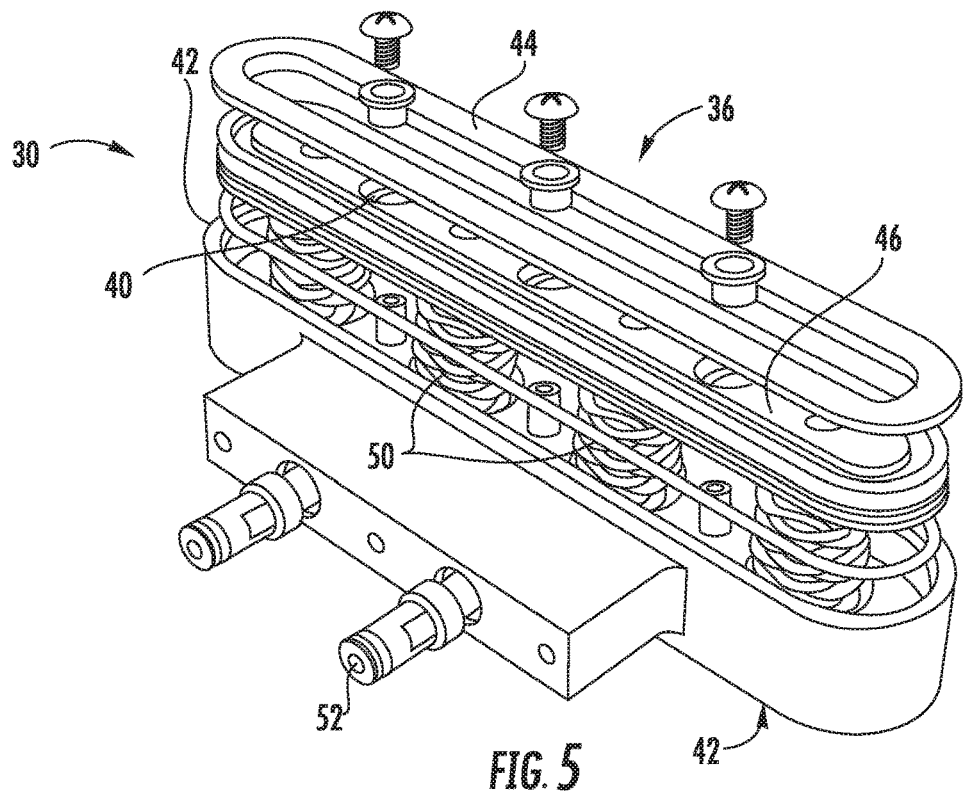
FIG. 5 is a partially exploded perspective view of the mounting section of FIG. 4.
Figure 6:
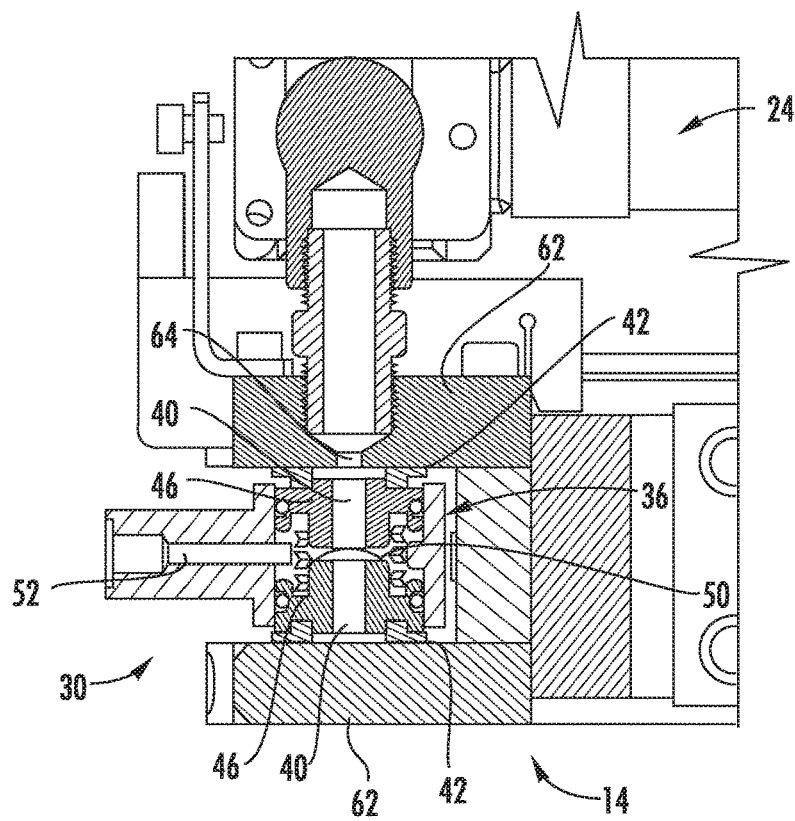
FIG. 6 is a sectional view of the mounting section of FIG. 4, taken along line 6-6 and shown with a section of the track of FIG. 1.

Referring also to FIGS. 4-6, a vacuum connection 36 is formed in the mounting section 30 for receiving vacuum from the vacuum valves 24 in the track 14 and supplying it to the workpiece retention section 34. The vacuum connection 36 includes a plurality of vacuum inlets 40 extending into opposite sides 42 of the mounting section 30. Preferably, the vacuum inlets 40 are formed within respective vacuum seals 44 which sealingly engage the track 14. More preferably, the vacuum inlets 40 and vacuum seals 44 are located on respective vacuum inlet plates 46, which are slidably mounted within the sides 42 of the mounting section 30 and urged apart from one another, and thus into engagement with the track 14, by biasing elements 50.

Vacuum introduced through the inlets 40 is routed out of the vacuum connection 36 via one or more vacuum channels 52. The workpiece retention section 34 receives the vacuum via the channels 52. The depicted embodiment shows dual channels 52, however more or fewer channels could be used. For example, if desired to allow the workpiece retention section 34 to rotate relative to the track 14, a single rotatable connection with collinear vacuum channels could be made between the mounting and workpiece retention sections 30, 34.

Referring again to FIG. 3, the driving mechanism engagement section 32 of each carriage 12 is adaptable based on the type of driving mechanism 20 employed with the conveyor system 10. The present invention is not necessarily limited to any particular type of driving mechanism, although in the depicted embodiment, the driving mechanism engagement section 32 is configured for engagement with an electromagnetic driving mechanism 20. Such an electromagnetic driving mechanism 20 is advantageously able to move each carriage 12 independently of the others.

Additionally, the driving mechanism engagement section 32 can include rollers 54 for holding the carriage 12 to an additional track/guide 56 (see FIG. 1). In such a configuration (as is depicted), the track 14 supplies vacuum to the carriages 12 but is not relied upon to physically retain the carriages 12 to the conveyor system 10 during movement along the conveying path 16.

The workpiece retention section 34 is adaptable based on the type of workpiece to be held and the desired application of vacuum thereto. In the depicted embodiment, the workpiece retention section 34 is configured to retain a workpiece thereto using vacuum. More particularly, the section 34 is configured to retain a workpiece within an internal passage 60. The present invention, however, is not necessarily limited to any particular use of vacuum once supplied to the carriage.

Figure 7:
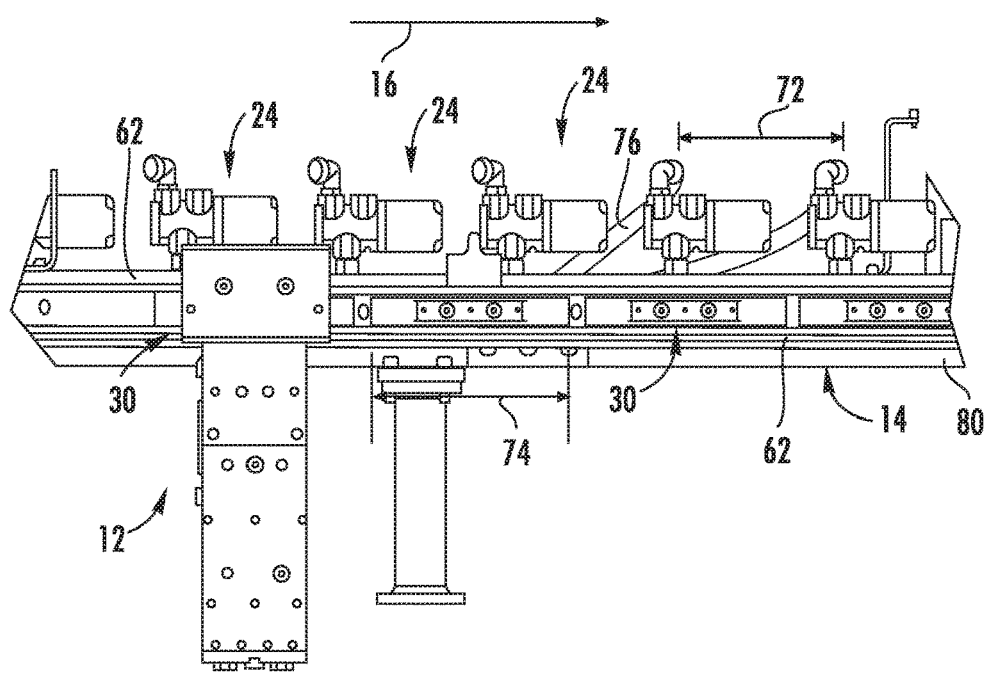
FIG. 7 is an elevational view of a portion of the conveyor system of FIG. 1.

Referring to FIGS. 6 and 7, the track 14 includes opposed track surfaces 62, which are engaged by the opposed sides 42 of the mounting section 30. The vacuum valves 24 are preferably connected to openings 64 extending through one of the track surfaces 62. The use of opposed track surfaces 62 and mounting section sides 42 is advantageous, as it helps equalize forces resulting from applied vacuum and consequently reduce binding forces generated between the track 14 and the mounting section 30 that would interfere with the slidable motion of each carriage 12.

In the depicted embodiment, the mounting section 30 sides 42 are arranged between the opposed track surfaces 62; however, the present invention is not necessarily limited to such a configuration. For example, a U-shaped mounting section could have opposed sides between which a track was located. Additionally, as discussed above, the track 14 is not necessarily required to retain the carriages 12. Hence, although the track 14 is substantially continuous between the vacuum valves 24 in the depicted embodiment, this is not necessarily required.

Referring also to FIG. 2, vacuum may not be required by the carriages around the complete circuit of the conveying path 16; for example, there can be working and non-working sections 66, 70 of the conveying path. If vacuum is not required by the carriages in the non-working section 70 (e.g., there is no workpiece to be retained), then the plurality of vacuum valves 24 can be connected to the track 14 only along the working section 66.

Where vacuum is required, advantageously vacuum valves 24 are arranged at a spacing 72 that is less than a length 74 of the mounting section 30 in the direction of the conveying path 16. Consequently, the vacuum connection 36 of the mounting section can simultaneously be in fluid communication with two adjacent vacuum valves 24. As each carriage 12 moves along the conveying path 16, vacuum from the next valve 24 can be obtained before vacuum from the preceding valve 24 is lost.

The vacuum valves 24 are preferably solenoid operated, allowing electronic control as will be described in greater detail below. Additionally, all or a portion of the vacuum valves 24 can be configured to supply a variable level of vacuum—for example, to temporarily reduce a retention force exerted on a workpiece.

The vacuum valves 24 are commonly connected to the vacuum source 30 by a respective plurality of vacuum lines 76 (only a portion thereof illustrated for clarity). Advantageously, the vacuum source 30 includes a vacuum plenum 80 running along the length of the track 14, to which the vacuum lines 76 connect. The vacuum plenum 80 can be connected to a vacuum pump or the like. Alternately, more than one independent vacuum source could be utilized; for example, with some portion of the vacuum valves 24 receiving vacuum from one source and another portion receiving it from a different source.

Figure 8:
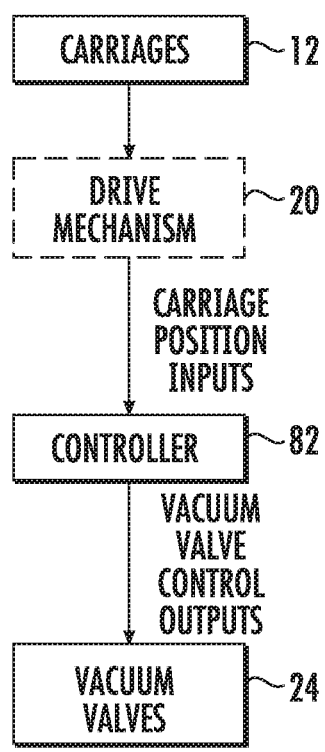
FIG. 8 is a schematic diagram of electronic controls of the conveyor system of FIG. 1.

Referring to FIG. 8, the vacuum valves 24 of the vacuum subsystem 22 are preferably electronically connected to a controller 82 (e.g., a programmable logic controller or other microprocessor device), which supplies respective control outputs thereto based on carriage position inputs. When the controller 82 determines, based on the position inputs, that the vacuum connection 36 of a carriage 12 is in position to be in fluid communication with a vacuum valve 24, the controller 82 will open the valve 24. When no carriage 12 is in fluid communication with a valve 24, the controller 82 will shut it. The controller 82 can perform these operations simultaneously for multiple valves 24.

Where an electromagnetic drive mechanism 20 is used, such that the drive mechanism independently "knows" the location of each carriage 12, the carriage position inputs can be supplied to the controller 82 by the drive mechanism. The controller 82 could alternatively receive carriage position inputs via other means. For example, position sensors corresponding to the valve 24 locations could be located along the track and send position input signals to the controller 82. Additionally, a central controller 82 could be omitted, which each vacuum valve 24 being actuated via a mechanical, electrical, magnetic, etc. indication that a carriage 12 is located adjacent thereto. Likewise, the valve 24, itself, need not be solenoid operated; for instance, mechanically or magnetically driven actuators could be used to operate the valves.

Advantageously, a conveyor system 10 according to the present invention is able to supply vacuum to plurality of carriages 12, while either stationary or moving along a conveying path 16. By only supplying vacuum when a carriage is actually in position to receive it, power requirements associated with the vacuum source can be significantly reduced and performance enhanced.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A conveyor system comprising:
    a track extending along a conveying path;
    at least one carriage having a mounting section slidably engaging the track, a vacuum connection being formed in the mounting section;
    a driving mechanism for moving the at least one carriage along the conveying path;
    a plurality of vacuum valves connected to the track along the conveying path; and
    a vacuum source connected to the plurality of vacuum valves to supply vacuum thereto;
    wherein the conveyor system is configured to selectively supply vacuum to the vacuum connection of the least one carriage via the plurality of vacuum valves based on a proximity of the at least one carriage thereto;
    wherein the track includes opposed first and second track surfaces extending along the conveying path, opposed first and second section sides of the mounting section respectively slidably engaging the first and second track surfaces; and
    wherein the vacuum connection includes opposed first and second vacuum inlets, the first and second vacuum inlets being respectively arranged on the first and second mounting section sides.

2. The conveyor system of claim 1, wherein the track is substantially continuous between the plurality of vacuum valves.

3. The conveyor system of claim 1, wherein the plurality of vacuum valves are connected to openings extending though the first track surface.

4. The conveyor system of claim 1, wherein the mounting section includes opposed first and second vacuum seals respectively located on the first and second mounting section sides around the first and second vacuum inlets and respectively engaging the first and second track surfaces.

5. The conveyor system of claim 4, wherein the mounting section further includes first and second vacuum inlet plates through which the first and second vacuum inlets are respective defined and on which the first and second vacuum seals are respectively carried, the first and second vacuum inlet plates being biased into engagement with the first and second track surfaces.

6. The conveyor system of claim 1, wherein the vacuum connection further includes opposed third and fourth vacuum inlets, the third and fourth vacuum inlets being respectively arranged on the first and second mounting section sides.

7. The conveyor system of claim 1, wherein the first and second sides of the mounting section are slidably received between the first and second track surfaces.

8. The conveyor system of claim 1, wherein the at least one carriage is configured to apply vacuum from the vacuum connection to releasably secure a workpiece thereto.

9. The conveyor system of claim 1, further comprising a controller, the controller in signal communication with the plurality of vacuum valves and receiving position inputs indicative of a position of the at least one carriage, the controller being configured to open and close each respective one of the plurality of vacuum valves based on the position of the at least one carriage.

10. The conveyor system of claim 9, wherein the controller is configured to open each of the plurality of vacuum valves able to be placed in fluid communication with vacuum connection of the at least one carriage based on the position inputs.

11. The conveyor system of claim 9, wherein the driving mechanism is an electromagnetic driving mechanism, the controller receiving the position inputs from the electromagnetic driving mechanism.

12. The conveyor system of claim 1, wherein a spacing between each of the plurality of vacuum valves is less than a length of the mounting section in a direction of the conveying path the such that the vacuum connection of the mounting section is able to be in fluid communication with two adjacent valves of the plurality of vacuum valves simultaneously.

13. The conveyor system of claim 1, wherein the track and conveying path extend in a complete circuit.

14. The conveyor system of claim 13, wherein the conveying path includes working and non-working sections, the plurality of vacuum valves only being connected to the track along the working section of the conveying path.

15. The conveyor system of claim 1, wherein at least a portion of the plurality of vacuum valves are configured to supply a variable degree of vacuum to the vacuum connection of the least one carriage.

16. The conveyor system of claim 1, wherein the vacuum source includes a vacuum plenum having a plurality of vacuum lines respectively extending therefrom to the plurality of vacuum valves.

17. The conveyor system of claim 1, wherein the at least one carriage includes a plurality of carriages, each having a mounting section slidably engaging the track, and a vacuum connection being formed in the mounting section; and wherein the conveyor system is configured to selectively and independently supply vacuum to the vacuum connection of all of the plurality of carriages via the plurality of vacuum valves based on respective proximities of the plurality of carriages thereto.

18. The conveyor system of claim 17, wherein the driving mechanism is an electromagnetic driving mechanism configured to move each of the plurality of carriages independently.

19. A conveyor system comprising:
a track extending along a conveying path;
at least one carriage having a mounting section slidably engaging the track, a vacuum connection being formed in the mounting section;
a driving mechanism for moving the at least one carriage along the conveying path;
a plurality of vacuum valves connected to the track along the conveying path; and
a vacuum source connected to the plurality of vacuum valves to supply vacuum thereto;
wherein the conveyor system is configured to selectively supply vacuum to the vacuum connection of the least one carriage via the plurality of vacuum valves based on a proximity of the at least one carriage thereto; and
wherein at least a portion of the plurality of vacuum valves are configured to supply a variable degree of vacuum to the vacuum connection of the least one carriage to temporarily reduce a retention force exerted on a workpiece carried thereby.

* * * * *